United States Patent
Kaushik et al.

(10) Patent No.: US 10,869,217 B2
(45) Date of Patent: *Dec. 15, 2020

(54) SDN (SOFTWARE-DEFINED NETWORKING) CONTROLLER FOR SELF-PROVISIONING OF A WIRELESS COMMUNICATION NETWORK USING COORDINATION OF DATA PLANE BEHAVIOR TO STEER STATIONS TO PREFERRED ACCESS POINTS

(71) Applicant: Fortinet, Inc., Sunnyvale, CA (US)

(72) Inventors: Anil Kaushik, Bangalore (IN); Siva Rama Krishna Rao Yogendra Jupudi, Bangalore (IN); Subrahmanyam Bhamidipati, Bangalore (IN)

(73) Assignee: Fortinet, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/266,205

(22) Filed: Sep. 15, 2016

(65) Prior Publication Data
US 2017/0070907 A1    Mar. 9, 2017

Related U.S. Application Data

(63) Continuation of application No. 14/515,502, filed on Oct. 15, 2014, now Pat. No. 10,194,345.

(51) Int. Cl.
*H04L 12/911* (2013.01)
*H04W 28/02* (2009.01)
(Continued)

(52) U.S. Cl.
CPC ...... *H04W 28/0231* (2013.01); *H04L 41/0896* (2013.01); *H04L 43/08* (2013.01); *H04L 45/56* (2013.01); *H04L 47/20* (2013.01); *H04L 69/22* (2013.01); *H04W 28/0205* (2013.01); *H04W 72/0493* (2013.01); *H04W 84/12* (2013.01); *H04W 88/08* (2013.01)

(58) Field of Classification Search
CPC ........................... H04L 47/20; H04W 28/0231
See application file for complete search history.

(56) References Cited

U.S. PATENT DOCUMENTS

| | | | |
|---|---|---|---|
| 8,243,679 B1* | 8/2012 | Huang ................ | H04W 36/30 370/331 |
| 8,363,102 B1* | 1/2013 | Kadoch .................. | H04N 7/18 348/148 |

(Continued)

*Primary Examiner* — Brandon M Renner
(74) *Attorney, Agent, or Firm* — Law Office Of Dorian Cartwright; Dorian Cartwright (57) ABSTRACT

A wireless communication network is self-provisioned using coordination of data plane behavior to steer stations to preferred access points. To do so, a policy concerning traffic flow for the wireless communication network is received. Data plane traffic flow is monitored at each of the plurality of access points distributed around the wireless communication network. At some point, it may be determined the data plane traffic flow at a first access point from needs to be reduced based on the data plane traffic flow relative to the policy. In response, a station is steered to a preferred access point using OpenFlow rules to affect data plane routing decisions at the access point (e.g., drop, delay, or reprioritize packets).

11 Claims, 6 Drawing Sheets

(51) Int. Cl.
*H04L 12/813* (2013.01)
*H04L 12/26* (2006.01)
*H04L 12/24* (2006.01)
*H04L 12/771* (2013.01)
*H04L 29/06* (2006.01)
*H04W 72/04* (2009.01)
*H04W 88/08* (2009.01)
*H04W 84/12* (2009.01)

(56) References Cited

U.S. PATENT DOCUMENTS

| | | | |
|---|---|---|---|
| 2007/0165537 A1* | 7/2007 | Magnusson | H04W 48/18 370/254 |
| 2010/0214943 A1* | 8/2010 | Immendorf | H04W 24/00 370/252 |
| 2014/0140211 A1 | 5/2014 | Chandrasekaran | |
| 2015/0043589 A1* | 2/2015 | Han | H04L 45/38 370/392 |
| 2015/0078362 A1* | 3/2015 | Kunieda | H04W 76/028 370/338 |
| 2015/0124622 A1 | 5/2015 | Kovvali | |
| 2015/0334045 A1* | 11/2015 | Tremblay | H04L 45/14 709/226 |
| 2015/0373579 A1 | 12/2015 | Xu et al. | |
| 2016/0050587 A1* | 2/2016 | Lam | H04W 28/08 370/235 |

* cited by examiner

SDN (SOFTWARE-DEFINED NETWORKING) CONTROLLER FOR SELF-PROVISIONING OF A WIRELESS COMMUNICATION NETWORK USING COORDINATION OF DATA PLANE BEHAVIOR TO STEER STATIONS TO PREFERRED ACCESS POINTS

CROSS-REFERENCE TO RELATED APPLICATIONS

This application is a continuation of U.S. patent application Ser. No. 14/515,502 filed Oct. 15, 2014, entitled Self-Provisioning of a Wireless Communication Network Using Coordination of Data Plane Behavior to Steer Stations to Preferred Access Points by Anil Kaushik et al., the content of which is incorporated herein by reference in its entirety.

FIELD OF THE INVENTION

The invention relates generally to wireless computer networking, and more specifically, to self-provisioning a wireless communication network with a centralized data plane for access points.

BACKGROUND

Wi-Fi networks are widely-available and used more often with the growth of mobile devices. These networks operate under standards such as IEEE 802.11 (promulgated by the Institute of Electrical and Electronics Engineers), and others (e.g., Hot Spot 2.0). Management of these networks will become more burdensome and complex with increasing loads and numbers of connections.

Wi-Fi controllers are coupled to access points of a communication network in order to manage connections with stations seeking access to a backbone network, including the Internet. One aspect of management is the assignment and tracking of BSSIDs (Basic Service Set Identifiers) that identify access points to stations for traffic flows.

However, these protocols are limited to managing wireless connections from stations. No consideration is given to the wired backbone that supports the wireless portion of a communication network. Further, the management techniques can be limited to control layer aspects of wireless networking. Additionally, the widely-dispersed access points make data plane decisions primarily from a local perspective, due to limited visibility under conventional techniques.

What is needed is a robust technique to automatically provision wireless communication networks based on characteristics data plane layer. The provisioning should control which access points to which specific stations connect, by controlling data plane routing decisions.

SUMMARY

These shortcomings are addressed by the present disclosure of methods, computer program products, and systems for automatically provisioning a plurality of access points in a wireless communication network by coordinating data plane behavior of the plurality of access points to steer clients to preferred access points.

In one embodiment, a policy concerning traffic flow for the wireless communication network is received. Data plane traffic flow is monitored at each of the plurality of access points distributed around the wireless communication network. At some point, it may be determined the data plane traffic flow at a first access point from needs to be reduced based on the data plane traffic flow relative to the policy.

In another embodiment, responsive to the determination, at least one station is steered to a second access point in order to adjust the actual data plane traffic flow. One implementation of steering includes generating data plane rules (e.g., OpenFlow rules) directed at how packets concerning station are handled (e.g., drop, delay, or change priority of packets from station flow) by the first access point in the data planes in order to compel the at least one station to disconnect from the first access point or port (e.g., responsive to station flow characteristics as revealed by deep packet inspection techniques of packets forwarded from the first access point to a SDN, or Software-Defined Networking, controller). The data plane rules are transmitted for implementation at a data plane of the first access point, and optionally, at data planes of other access points.

Advantageously, network management is eased with automatic provisioning of network resources.

BRIEF DESCRIPTION OF THE DRAWINGS

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for automatically provisioning a plurality of access points in a wireless communication network by coordinating data plane behavior of the plurality of access points to steer clients to preferred access points. One of ordinary skill in the art will recognize that many other scenarios are possible, as discussed in more detail below.

Figure 1:
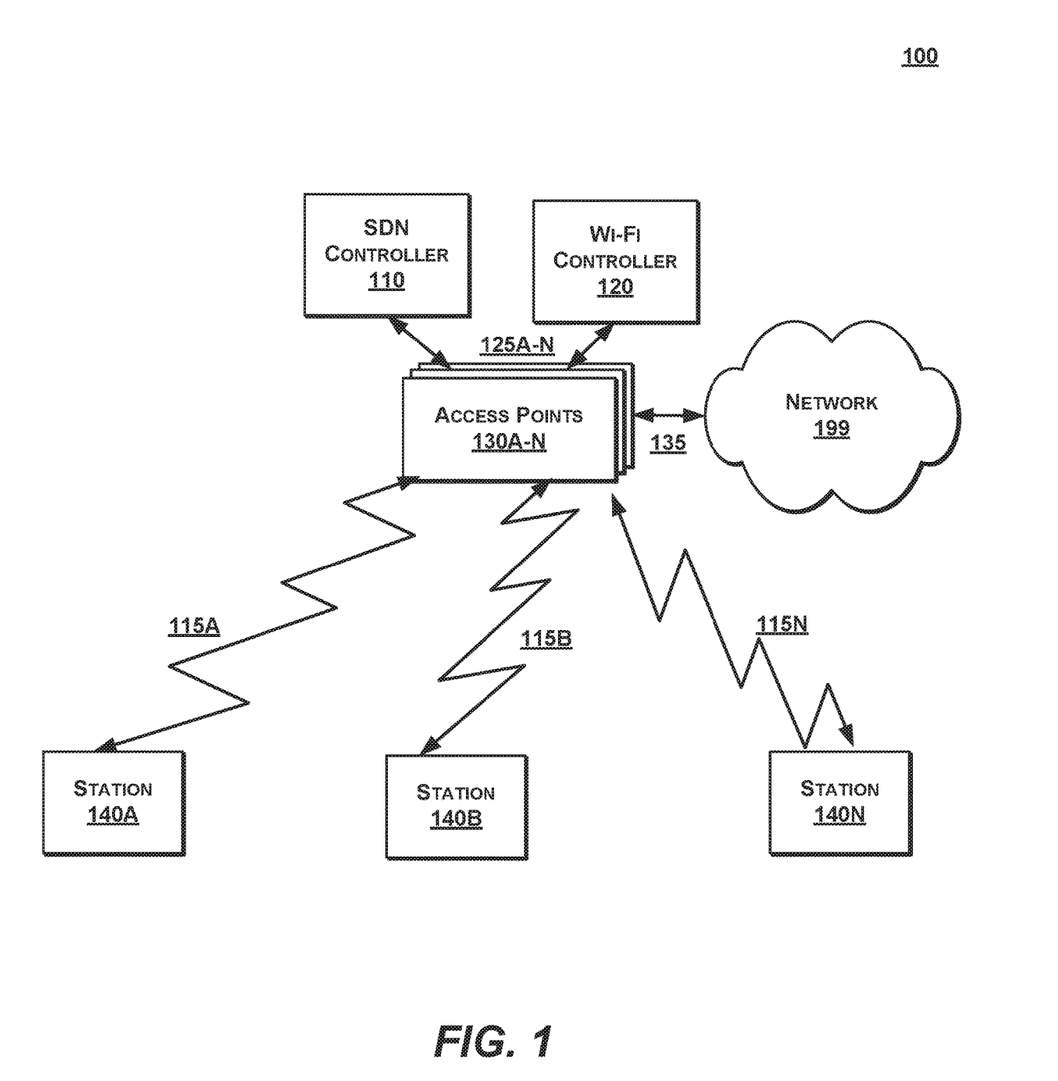
FIG. 1 is a high-level block diagram illustrating a system to self-provision a centralized data plane in a wireless communication network to steer stations to preferred access points, according to one embodiment.
Figure 2:
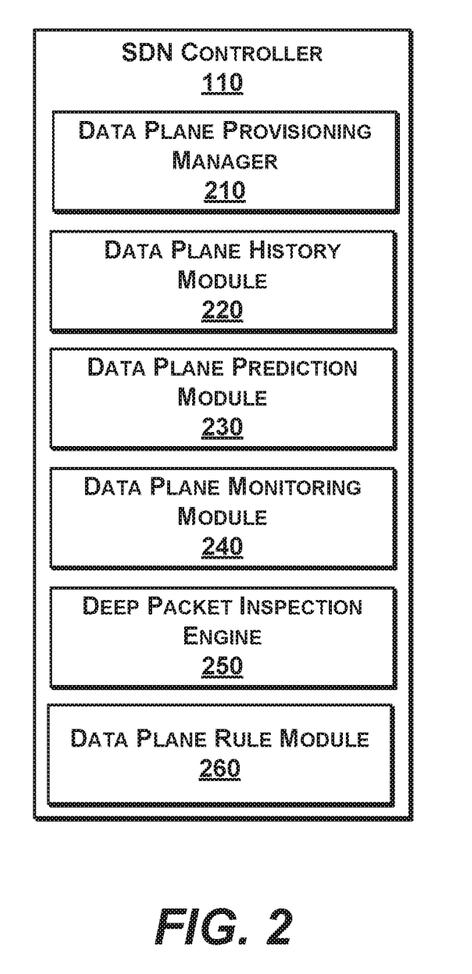
FIG. 2 is a more detailed block diagram illustrating an SDN (Self-Defined Networking) controller of the system of FIG. 1, according to one embodiment.
Figure 3:
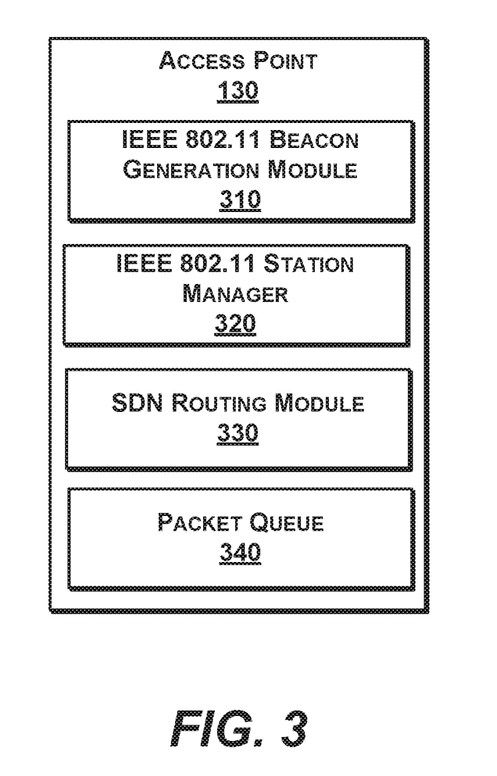
FIG. 3 is a more detailed block diagram illustrating an access point of the system of FIG. 1, according to one embodiment.

Systems to Automatically Provision Access Points with an SDN Controller (FIGS. 1-3)

FIG. 1 is a high-level block diagram illustrating a system 100 to self-provision a centralized data plane in a wireless communication network to steer stations to preferred access points, according to one embodiment. The system 100 comprises an SDN controller 110, a Wi-Fi controller 120, access points 130A-N, and stations 140A-N. The components can be coupled to a network 199, such as the Internet, a local network or a cellular network, through any suitable wired (e.g., Ethernet) or wireless (e.g., Wi-Fi or 4G) medium, or combination. In a preferred embodiment, the stations 140A-N are coupled to the access points 130A-N through wireless communication channels 115A-N, while the access points 130A-N can be coupled to the SDN and Wi-Fi controllers 110, 120 through wired communication channels 125A-N and to network 199 through wired communication channel 135. Other embodiments of communication channels are possible, including a cloud-based controller, and hybrid networks. Additional network components can also be part of the system 100, such as firewalls, virus scanners, routers, switches, application servers, databases, and the like.

The SDN controller 110 can communicate with each of the access points 130A-N using the OpenFlow or other protocol to directly implement layer 2 rules affecting network behavior. More specifically, the SDN controller 110 steers stations, in one embodiment, from a currently connected access point to preferred access points using data plane rules (e.g., OpenFlow rules or any rules to directly affect routing decisions) to control data planes of the access points 130A-N. OpenFlow provides cross-vendor communication as an abstraction of vendor-specific internal programming. Initially, the network 199 is profiled by gathering information about traffic flows in data planes for the access points 130A-N. The distributed activities can be abstracted with respect to traffic patterns, loads, queue usage, default routing decisions, latency, and other traffic flow characteristics. Based on the historical information, data plane traffic flow can be predicted from a network-wide perspective and locally at access points. One way of analyzing data is to generate one or more histograms in order to identify a statistical model to characterize future behavior based on the past behavior. Many implementation-specific scenarios are possible.

The SDN controller 110 monitors data plane traffic flows at the access points 130A-N in view of a policy or set of rules to determine any necessary adjustments. The policy can be general address system-wide parameters, access-point wide parameters, or specific station parameters. Rules can be abstract or specific layer 2 routing directives and queue rules. In one embodiment, stations at burdened access points are compelled to move to preferred access points having capacity, or that are less burdened. Steering can be implemented by controlling layer 2 routing decision with OpenFlow rules that are distributed to the stations 130A-N. In another embodiment, selecting particular stations or ports for steering is determined based on characteristics of traffic involving the stations. In more detail, deep packet inspections can reveal, for example, that a traffic flow concerns video streaming for a certain application that is more optimally handled by a different access point, that a traffic flow concerns a low priority or policy-violating application such as social networking or pornography that is wasting bandwidth of a burdened access point, or that traffic flow is suspicious, just to name a few non-limiting characteristics. Steering can also be implemented due to traffic flows that are out of bounds with respect to predicted traffic flows (e.g., by stochastic modeling from gathered data of access points).

More generally, the SDN controller 110 centralizes data plane decision-making for the access points 130A-N. To do so, the access points 130A-N are configured to concede layer 2 routing decisions to the SDN controller 110 by forwarding packets to the SDN controller 110 for routing instructions. The SDN controller can use input gathered across the network to make layer 2 routing decisions for the packets which are communicated back to the forwarding one of the access points 130A-N. In one embodiment, routing decisions are made as a reaction to new or unknown flows. In another embodiment, access points are pre-configured by the SDN controller with rules for automatically implementing SDN controller 110 decisions on matching packets in the future. In still another embodiment, the rules or policies are distributed to the other network devices along a routing path for multi-hop data plane control.

Figure 7:
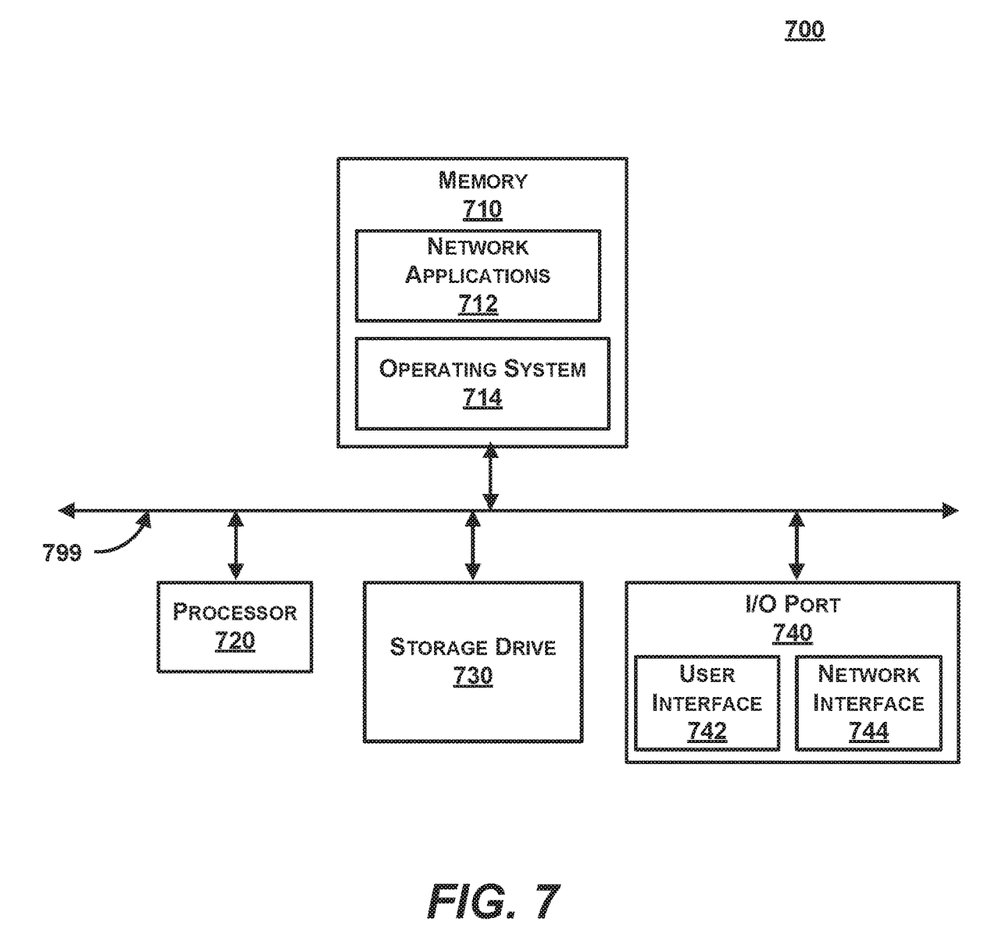
FIG. 7 is a block diagram illustrating an exemplary computing device, according to one embodiment.

The SDN controller 110 can be, for example, a personal computer, a laptop computer, a server, a cloud-based device, a virtual device, or the like implemented in any of the computing devices discussed herein (e.g., see FIG. 7). Additional embodiments of the SDN controller 110 are discussed with respect to FIG. 2.

Within the system 100, the Wi-Fi controller 120 communicates with each of the access point 130A-N to manage wireless connections to the stations 140A-N using IEEE protocols. In some embodiments, BSSIDs (Basic Service Set Identifiers) are managed from the Wi-Fi controller 120 to implement functionality such as seamless mobility for transparent handoffs of stations between access points all having a common BSSID. In other functionality such as virtual port, the Wi-Fi controller 130 coordinates a uniquely-assigned BSSID for each station in order to provide individualized management of stations connected at any access point. In some embodiments, the Wi-Fi controller 120 can be an independent physical device form.

The Wi-Fi controller 120 can be implemented in any of the computing devices discussed herein (e.g., see FIG. 7). For example, the Wi-Fi controller 120 can be an MC1500 or MC6000 device by Meru Networks of Sunnyvale, Calif. In one embodiment, the SDN controller 110 and the Wi-Fi controller 120 are integrated into a single physical device. In another embodiment, information concerning network management is passed between the SDN controller 110 and the Wi-Fi controller 120.

The access points 130A-N can steer stations according to OpenFlow rules that require packets from a station be dropped or delayed to the extent that the station will voluntarily disconnect from the offending access point. Other access points can be similarly configured to intentionally drop packets during a connection attempt or after allowing a connection. The access points 130A-N, without input from the SDN controller 110, may forward packets according to a shortest route, or other standard routing or switching algorithm. Local-level conditions can be revealed by TCP (transmission control protocol). However, the SDN controller 110 has a network-wide view of layer 2 conditions and can override inherent TCP forwarding behavior as needed. In other words, the access points 130A-N may continue to make control plane decisions but data plane decisions are conceded to the SDN controller 110, in some or all situations. Further, although the Wi-Fi controller 120 has some network-wide visibility, it is limited to Wi-Fi-relevant information for load balancing, managing a number of station connections at a particular access point, tracking BSSIDs, and the like. While the higher-layer decisions on the access points 130A-N can have some indirect impact on data plane decision making, the SDN controller 110 makes direct data plane decisions. The SDN controller 110 policies, as implemented, can override, co-exist, or compete with policies of the Wi-Fi controller 120 and the access points 130A-N.

To provide network service to the stations 140A-N, in one embodiment, the access points 130A-N comply with IEEE 802.11 protocols (promulgated by the Institute of Electrical and Electronics Engineers) to provide Wi-Fi service to the stations 140A-N over wireless communication channels 140A-N. Under IEEE 802.11, a beacon with one or more BSSIDs is periodically sent to advertise a presence for new connections and maintain current connections. Then the access points 130A-N listen for packets addressed to associated BSSIDs and ignore packets addressed to unassociated BSSIDs. Furthermore, the access points 130A-N forward packets addressed to MAC (Media Access Control) addresses of associated stations.

The access points 130A-N include one or more individual access points implemented in any of the computing devices discussed herein (e.g., see FIG. 7). For example, the access points 130A-N can be an AP 110 or AP 433 (modified as discussed herein) by Meru Networks of Sunnyvale, Calif. A network administrator can strategically place the access points 130A-N for optimal coverage area over a locale. The access points 130A-N can, in turn, be connected to a wired hub, switch or router connected to the network 199. In embodiment, the access point 130A-N functionality is incorporated into a switch or router.

The stations 140A-N can be, for example, a personal computer, a laptop computer, a tablet computer, a smart phone, a mobile computing device, a server, a cloud-based device, a virtual device, an Internet appliance, or any of the computing devices described herein (see e.g., FIG. 7). No special client is needed for this particular technique, although other aspects of the network may require downloads to the stations 140A-N. The stations 140A-N connect to the access points 130A-N for access to, for example, a LAN or external networks using an RF (radio frequency) antenna and network software complying with IEEE 802.11.

FIG. 2 is a more detailed block diagram illustrating the SDN controller 110 of the system 100, according to one embodiment. The SDN controller 110 comprises a data plane provisioning manager 210, a data plane history module 220, a data plane prediction module 230, a data plane monitoring module 240, a deep packet inspection engine 250, and data plane rule module 260. The components can be implemented in hardware, software, or a combination of both.

The data plane provisioning manager 210 uses a communication interface to connect with access points and other network devices around the network 100, to receive status updates and forwarded packages from access points and other network devices, and to transmit rules generated by the SDN controller 110. Access points can be registered with the SDN controller 110 manually by a network administrator or automatically by receiving notification from the Wi-Fi controller 120. The data plane manager 210 can call various modules for analysis and a determination of resulting actions. The data plane history module 220 gathers information about data flows at access points. The data plane prediction module 230 can predict future traffic flows at an access point based on the history, using statistical modeling. The data plane monitoring module 240 provides real-time and centralized data on distributed traffic flows. The deep packet inspection engine 250 can sniff forwarded packets to determine characteristics of a flow (e.g., applications, video, etc.). The data plane rule module 260 generates rules (e.g., OpenFlow rules, XML rules, source code, or proprietary commands) in real-time and in response to access point monitoring and/or deep packet inspection. The rules can steer stations from currently-connected access points to preferred access points. Additional modules can be added for other types of analysis and action.

FIG. 3 is a more detailed block diagram illustrating a representative access point 130 of the system 100, according to one embodiment. The access point 130 comprises an IEEE 802.11 beacon generation module 310, an IEEE 802.11 station manager 320, an SDN routing module 330, and a packet queue 340. The components can be implemented in hardware, software, or a combination of both.

The IEEE 802.11 beacon generation module 310 generates beacons with embedded BSSIDs and parameters, according to IEEE 802.11 protocols. The IEEE 802.11 station manager 320 stores globally and/or locally-influenced parameter values, policy-based parameter values, manually configured parameter values, or the like. Wi-Fi status data related to a number of connected stations, usage data, and the like can be collected from the IEEE 802.11 beacon generation module 310 and the IEEE 802.11 station manager 320 for the SDN controller 110.

The SDN routing module 330 forwards packets and statuses to the SDN controller 110. The first few packets from new flows can be sent to the SDN controller 110 for analysis. Alternatively, there may already be rules present that direct handling of the new flows. Example statuses can be a download rate for a specific flow, queue capacity, routing statistics, and more. Periodic updates are made on a regular basis or responsive to change. Additionally, the SDN routing module 330 also receives and implements rules in OpenFlow or other formats. The packet queue 340 stores packets for flows until forwarded to an appropriate station. Delays for a station being steered can be implemented by altering queuing of associated packets.

Figure 4:
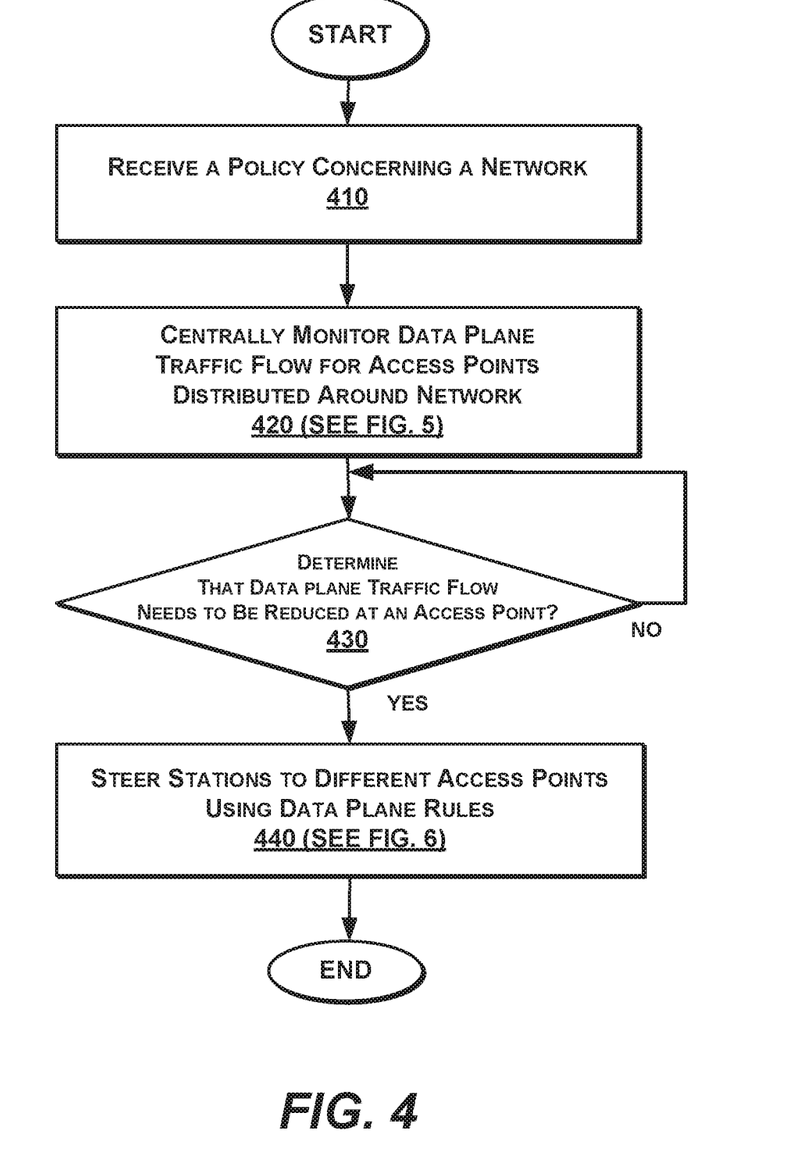
FIG. 4 is a high-level flow diagram illustrating a method for self-provisioning a centralized data plane in a wireless communication network, according to one embodiment.
Figure 5:
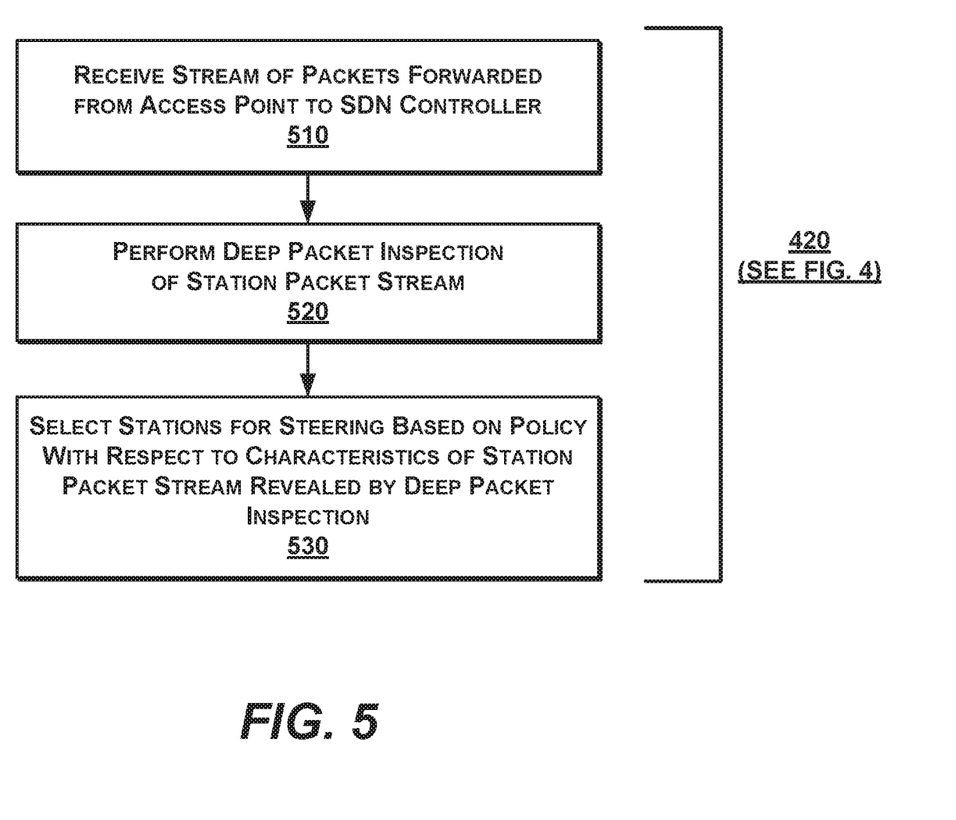
FIG. 5 is a more detailed flow diagram illustrating a step of monitoring data flows at the data plane for the method of FIG. 4, according to one embodiment.
Figure 6:
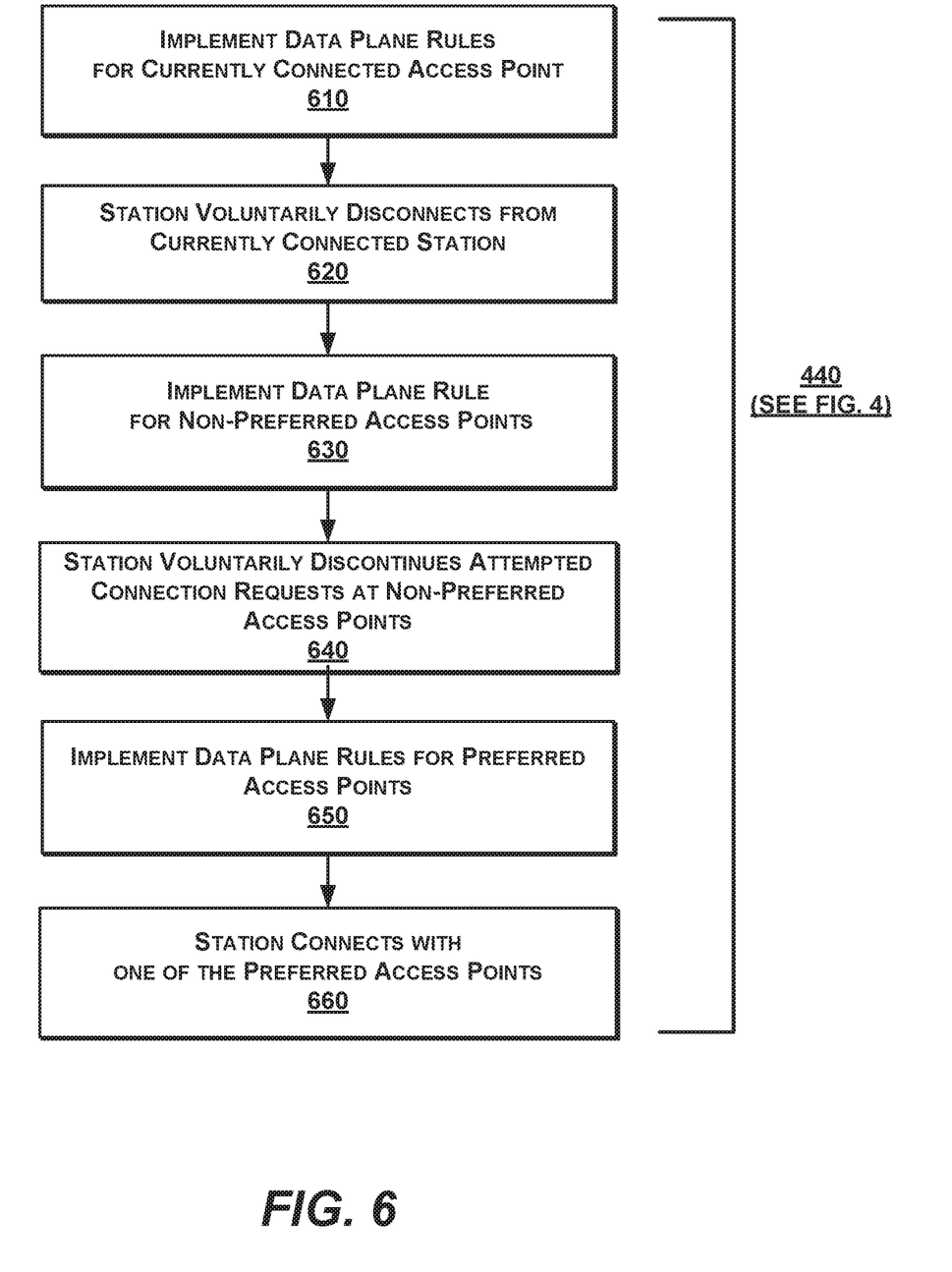
FIG. 6 is a more detailed flow diagram illustrating a step of steering stations to a preferred access point, according to one embodiment.

Methods for Automatically Provisioning Access Points with an SDN Controller (FIG. 4-6)

FIG. 4 is a high-level flow diagram illustrating a method for self-provisioning a centralized data plane in a wireless communication network (e.g., in the SDN controller 110 of FIG. 1), according to one embodiment. One of ordinary skill in the art will recognize that the method 400 is non-limiting as other embodiments can have more or less steps and can be performed in a different order.

A policy concerning traffic flow for the wireless communication network is received (step 410). Data plane traffic flow is centrally monitored for each of the plurality of access points distributed around the wireless communication network, as is detailed in association with FIG. 5 (step 420). It can be determined that that the data plane traffic flow at a first access point from the plurality of access point needs to be reduced based on the data plane traffic flow relative to the policy (step 430). Stations are steered to a second access point of the plurality of access point in order to adjust the data plane traffic flow with data plane rules (e.g., OpenFlow rules), as described in more detail below with respect to FIG. 6 (step 440).

FIG. 5 is a more detailed flow diagram illustrating the step 420 of monitoring data flows at the data plane for the method 400 of FIG. 4, according to one embodiment.

A stream of packets forwarded by an access point to the SDN controller is received (step 510). Deep packet inspection of the station packet stream is performed (step 520). Stations are selected for steering based on the policy with respect to characteristics of the partial packet stream revealed by the deep packet inspection (step 530).

FIG. 6 is a more detailed flow diagram illustrating the step 440 of steering stations to a preferred access point for the method 400 of FIG. 4, according to one embodiment.

Data plane rules directed at how packets concerning the station are handled by the currently connected access point in the data plane are generated by the SDN and implemented at the currently connected access point (step 610). In response, the station voluntarily disconnect from the current connected access point (step 620). Data plane rules directed at how packets concerning the station are handled by other non-preferred access points are generated by the SDN and implemented at the non-preferred access point (step 630). Consequentially, the station voluntarily discontinues connection attempts to the non-preferred access points (step 640). Data plane rules directed at how packets concerning the station are handled by a preferred access point (or access points) are generated by the SDN and implemented at the currently preferred access point (step 650). Ultimately, the station connects to the preferred access point (step 660).

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the SDN controller 110, the Wi-Fi controller 120, the access points 130A-N, and the stations 140A-N. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of SDN controllers or access points as illustrated in FIGS. 2 and 3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730.

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a SDN (Software-Defined Networking) controller that automatically provisions a plurality of access points in a wireless communication network by coordinating layer 2 data plane behavior of the plurality of access points to steer clients to preferred access points, the method comprising the steps of:

receiving a policy concerning traffic flow for the wireless communication network;

gathering network-wide information about traffic flows in the data plane for a plurality of access points distributed around the wireless communication network, the data plane referring to layer-2 communications;

predicting a data plane traffic flow at each of the plurality of access points based on the gathered information;

deploying a subset of the plurality of access points according to the predicted data plane traffic flow;

centrally monitoring layer 2 data plane traffic flow at each of the plurality of access points distributed around the wireless communication network, a data plane referring to layer 2 communications, the step of centrally monitoring layer 2 data plane traffic flow:

prior to receiving a partial packet stream from an first access point, sending one or more OpenFlow rules to the first access point that defines traffic flows that should be forwarded to the SDN controller;

receiving at least the partial stream of packets of the first access point, the packets forwarded by the first access point to the SDN controller;

performing deep packet inspection of the partial packet stream of the first access point; and selecting the one or more stations for steering based on the policy with respect to characteristics of the partial packet stream revealed by the deep packet inspection;

determining that the data plane traffic flow at the first access point from the plurality of access point needs to be reduced based on the actual data plane traffic flow relative to the predicted data plane traffic flow;

steering at least one station to a second access point of the plurality of access point in order to adjust the layer 2 data plane traffic flow by generating one more OpenFlow rules directed at how packets concerning the at least one station are handled by the first access point in the data planes in order to compel the at least one station to disconnect from the first access point; and transmitting the one or more OpenFlow rules for implementation at a layer 2 data plane of the first access point.

2. The method of claim 1, wherein:

generating the one or more OpenFlow rules comprises generating one more OpenFlow rules directed at how packets concerning the at least one connected station are handled by the plurality of access points in the layer 2 data planes in order to compel the at least one connected station to disconnect from the first access point and to discontinue connection attempts at any of the plurality of access points except the second access point.

3. The method of claim 1, further comprising:

gathering network-wide information about traffic flows in layer 2 data planes for a plurality of access points distributed around the wireless communication network;

predicting a layer 2 data plane traffic flow at each of the plurality of access points based on the gathered information; and determining that the layer 2 data plane traffic flow at a first access point from the plurality of access point needs to be reduced based on the actual layer 2 data plane traffic flow relative to the predicted layer 2 data plane traffic flow.

4. The method of claim 1, wherein the plurality of access points continue to respond to connection attempts by the one or more stations per IEEE 802.11 protocol, despite implementing the one or more OpenFlow rules.

5. The method of claim 1, wherein the plurality of access points continue to broadcast at least one BSSID to stations within range, despite implementing the one or more OpenFlow rules.

6. The method of claim 1, wherein the plurality of access points continue to autonomously handle packets in control planes, while ceding handling of packets in the layer 2 data planes to the SDN controller which centralizes control of a layer 2 data plane of each of the plurality of access points.

7. The method of claim 1, wherein at least two of the plurality of access points implementing the one or more OpenFlow rules are manufactured by different vendors and have distinct operating systems.

8. The method of claim 1, wherein the one or more OpenFlow rules control layer 2 routing decisions.

9. The method of claim 1, further comprising:

implementing the one or more OpenFlow rules at the layer 2 data plane of at least one network device outside of the plurality of access points.

10. A non-transitory computer-readable medium storing source code that, when executed by a processor, performs a method in a SDN (Software-Defined Networking) controller that automatically provisions a plurality of access points in a wireless communication network by coordinating layer 2 data plane behavior of the plurality of access points to steer clients to preferred access points, the method comprising the steps of:

receiving a policy concerning traffic flow for the wireless communication network;

gathering network-wide information about traffic flows in the data plane for a plurality of access points distributed around the wireless communication network, the data plane referring to layer-2 communications;

predicting a data plane traffic flow at each of the plurality of access points based on the gathered information;

deploying a subset of the plurality of access points according to the predicted data plane traffic flow;

centrally monitoring layer 2 data plane traffic flow at each of the plurality of access points distributed around the wireless communication network, a data plane referring to layer 2 communications, the step of centrally monitoring layer 2 data plane traffic flow:

prior to receiving a partial packet stream from an first access point, sending one or more OpenFlow rules to the first access point that defines traffic flows that should be forwarded to the SDN controller;

receiving at least the partial stream of packets of the first access point, the packets forwarded by the first access point to the SDN controller;

performing deep packet inspection of the partial packet stream of the first access point; and selecting the one or more stations for steering based on the policy with respect to characteristics of the partial packet stream revealed by the deep packet inspection;

determining that the data plane traffic flow at a first access point from the plurality of access point needs to be reduced based on the actual data plane traffic flow relative to the predicted data plane traffic flow;

steering at least one station to a second access point of the plurality of access point in order to adjust the layer 2 data plane traffic flow by generating one more OpenFlow rules directed at how packets concerning the at least one station are handled by the first access point in the data planes in order to compel the at least one station to disconnect from the first access point; and transmitting the one or more OpenFlow rules for implementation at a layer 2 data plane of the first access point.

11. An SDN (Software-Defined Networking) controller that automatically provisions a plurality of access points in a wireless communication network by coordinating layer 2 data plane behavior of the plurality of access points to steer clients to preferred access points, the SDN controller comprising:

a processor;

a memory, comprising a first module, a second module, a third module, a fourth module, a fifth module, a sixth module, a seventh module, and an eight module:

the first module to receive a policy concerning traffic flow for the wireless communication network, a data plane referring to layer 2 communications;

the second module to gather network-wide information about traffic flows in the data plane for a plurality of access points distributed around the wireless communication network, the data plane referring to layer-2 communications;

the third module to predict a data plane traffic flow at each of the plurality of access points based on the gathered information;

the fourth module to deploy a subset of the plurality of access points according to the predicted data plane traffic flow;

the fifth module to centrally monitor layer 2 data plane traffic flow at each of the plurality of access points distributed around the wireless communication network, comprising:

prior to receiving a partial packet stream from an first access point, sending one or more OpenFlow rules to the first access point that defines traffic flows that should be forwarded to the SDN controller;

receiving at least the partial stream of packets of the first access point, the packets forwarded by the first access point to the SDN controller;

performing deep packet inspection of the partial packet stream of the first access point; and selecting the one or more stations for steering based on the policy with respect to characteristics of the partial packet stream revealed by the deep packet inspection;

the sixth module to determine that the data plane traffic flow at a first access point from the plurality of access point needs to be reduced based on the actual data plane traffic flow relative to the predicted data plane traffic flow;

the seventh module to steer at least one station to a second access point of the plurality of access point in order to adjust the layer 2 data plane traffic flow by generating one more OpenFlow rules directed at how packets concerning the at least one station are handled by the first access point in the layer 2 data planes in order to compel the at least one station to disconnect from the first access point; and the eight module to transmit the one or more OpenFlow rules for implementation at a layer 2 data plane of the first access point.

* * * * *